(12) United States Patent
Lee (10) Patent No.: US 8,877,398 B2
(45) Date of Patent: Nov. 4, 2014

(54) FUEL CELL STACK WITH COOLANT FLOW GUIDE MEMBERS IN COOLANT INLET AND OUTLET MANIFOLD

(75) Inventor: Sung Ho Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 525 days.

(21) Appl. No.: 12/951,212

(22) Filed: Nov. 22, 2010

(65) Prior Publication Data

US 2012/0077105 A1 Mar. 29, 2012

(30) Foreign Application Priority Data

Sep. 29, 2010 (KR) .................. 10-2010-0094005

(51) Int. Cl.
*H01M 8/02* (2006.01)
*H01M 8/04* (2006.01)
*H01M 8/24* (2006.01)

(52) U.S. Cl.
CPC ........ *H01M 8/04014* (2013.01); *H01M 8/2485* (2013.01); *Y02E 60/50* (2013.01); *H01M 8/04701* (2013.01); *H01M 8/242* (2013.01); *H01M 8/0432* (2013.01)
USPC ........... 429/434; 429/437; 429/439; 429/442; 429/457; 429/514

(58) Field of Classification Search
USPC .......... 429/452, 434, 437, 439, 442, 457, 514
See application file for complete search history.

(56) References Cited

FOREIGN PATENT DOCUMENTS

| JP | 06-260206 | 9/1994 |
|---|---|---|
| JP | 2001-127478 | 5/2001 |
| JP | 2004-241273 | 8/2004 |
| JP | 2005-085573 | 3/2005 |
| JP | 2008-108498 | 5/2008 |

OTHER PUBLICATIONS

Katou et al., Machine translation of JP 2008-108498 A, May 2008.*

* cited by examiner

*Primary Examiner* — Sean P Cullen
(74) *Attorney, Agent, or Firm* — Edwards Wildman Palmer LLP; Peter F. Corless (57) ABSTRACT

The present invention provides a fuel cell stack which can reduce variation in temperature distribution of whole cells by a simple change in the structure of a coolant inlet manifold and a coolant outlet manifold in the fuel cell stack without the use of a conventional insulator, which increases the thickness of the fuel cell stack, a heater, which requires a power supply and its control logic, or a cover for forming an air layer for thermal insulation, which disadvantageously prevents the heat generated in the electrode from being transferred to the end plate. The invention provides a fuel cell stack with improved temperature uniformity, comprising one or more coolant flow guide members positioned within a coolant outlet manifold and/or a coolant inlet manifold, which causes coolant present in the coolant outlet manifold to be recirculated to the coolant inlet manifold and then back through one or more predetermined cells adjacent to the end plate to the coolant outlet manifold, thereby providing uniformity in the heat of the fuel cell stack.

3 Claims, 13 Drawing Sheets

FIG. 1

PRIOR ART

FIG. 2

PRIOR ART

FIG. 3

PRIOR ART

FUEL CELL STACK WITH COOLANT FLOW GUIDE MEMBERS IN COOLANT INLET AND OUTLET MANIFOLD

CROSS-REFERENCE TO RELATED APPLICATION

This application claims under 35 U.S.C. §119(a) the benefit of Korean Patent Application No. 10-2010-0094005 filed Sep. 29, 2010, the entire contents of which are incorporated herein by reference.

BACKGROUND OF THE INVENTION (a) Technical Field

The present disclosure relates to an improved fuel cell stack. More particularly, it relates to an improved fuel cell stack having improved temperature uniformity, which can reduce variation in temperature distribution of whole cells by a simple change in the structure of a coolant inlet manifold and a coolant outlet manifold in the fuel cell stack.

(b) Background Art

A polymer electrolyte membrane fuel cell or a proton exchange membrane fuel cell (PEMFC) is a device that generates electricity with water by an electrochemical reaction between hydrogen and oxygen. The PEMFC has various advantages such as high energy efficiency, high current density, high power density, short start-up time, and rapid response to a load change as compared to the other types of fuel cells.

The configuration of a fuel cell stack will be briefly described below. A membrane-electrode assembly (MEA) is positioned in the center of each unit cell of the fuel cell stack. The MEA comprises a solid polymer electrolyte membrane, through which hydrogen ions (protons) are transported, and an electrode/catalyst layer such as cathode and an anode, in which the electrochemical reaction between hydrogen and oxygen takes place, disposed on each of both sides of the polymer electrolyte membrane.

Moreover, a gas diffusion layer (GDL) and a gasket are sequentially stacked on both sides of the MEA where the cathode and the anode are located. A separator is located on the outside of the GDL. The separator includes flow fields through which reactant gases (such as hydrogen as a fuel and oxygen or air as an oxidant) are supplied and coolant passes.

A plurality of unit cells each having the above-described configuration are stacked, and an end plate for supporting the unit cells is connected to each of both ends thereof. That is, the unit cells are arranged between the end plates, whereby the unit cells and the end plates are fastened to each other to form the fuel cell stack.

The principle of operation of the PEMFC is as follows. Hydrogen as a fuel and oxygen (air) as an oxidant are supplied to the anode and the cathode of the MEA through the flow fields of the separator, respectively. The hydrogen supplied to the anode as an oxidizing electrode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane. The electrons are transmitted to the cathode through the GDL functioning as a conductor, the separator, and an external conducing wire. The flow of electrons through the external conducting wire generates electricity.

At the cathode as a reducing electrode, the hydrogen ions supplied through the (polymer) electrolyte membrane and the electrons transmitted through the separator react with the oxygen-containing air supplied to the cathode to produce heat and water.

Since the voltage of each unit cell is low (typically below 1 V) during operation, several tens to several hundreds of unit cells are stacked in series to increase the total voltage produced, thereby forming a fuel cell stack for use as a power generator.

The polymer electrolyte membrane fuel cell exhibits high performance in a temperature range from room temperature to 80° C. As the temperature is lowered, the performance may be reduced by a reduction in reaction activity and a reduction in ion conductivity of the electrolyte membrane.

Temperature considerations are especially important in view of cold weather seasons. For example, when the temperature of the fuel cell stack mounted in the vehicle is lowered below the freezing point as the outside temperature is below zero in winter, the activity of the electrode is reduced. Further, the conductivity fuel cell stack is also reduced because the water that transfers hydrogen ions in the electrolyte membrane is frozen, thereby reducing the performance.

Moreover, when the temperature is low while humidified gas is supplied, a flooding problem occurs due to condensation of water, which has a critical effect on the performance and durability of the fuel cell stack.

Therefore, in order to operate the fuel cell stack in which several hundreds of unit cells are stacked together at an optimal temperature in any environment, it is important to uniformly maintain the temperature distribution of the entire fuel cell stack in a predetermined range.

The end plate including a current collector for maintaining the fastening force and collecting current is located at both ends of the fuel cell stack. It can be seen from numerous tests and papers that the temperature of cells adjacent to the end plate (or current collector) is lower than that of the other cells.

Figure 1:
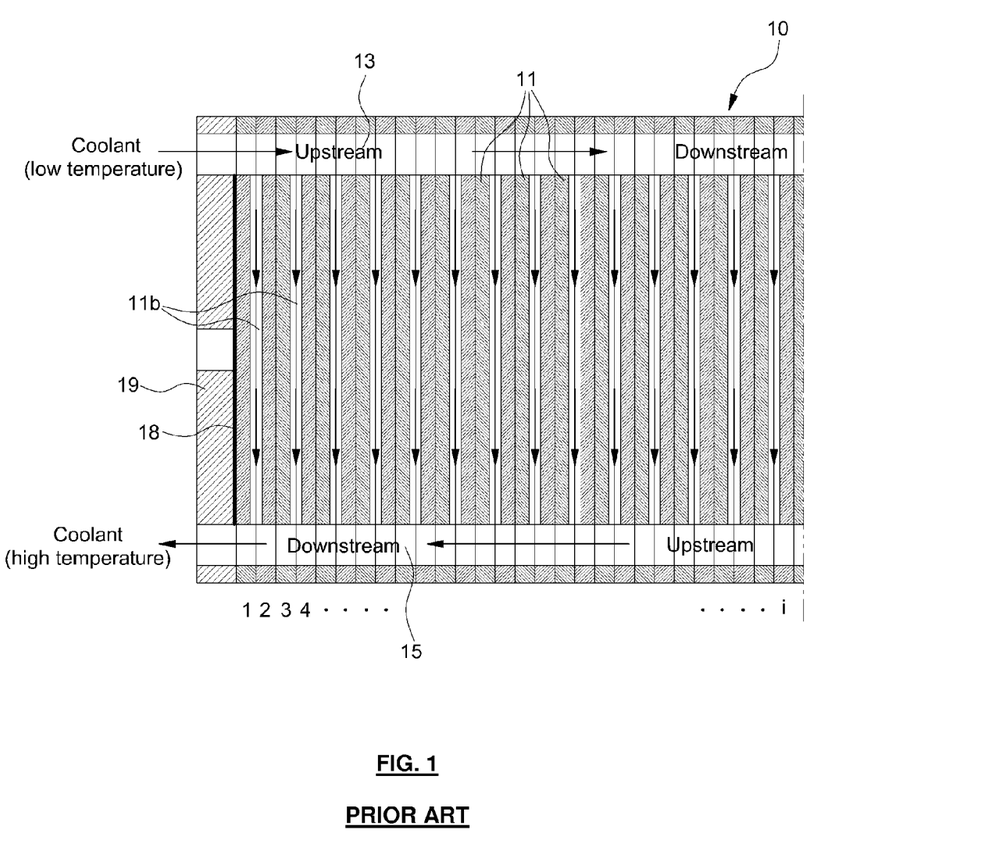
FIG. 1 is diagram showing the flow of coolant in a conventional fuel cell stack.

FIG. 1 is a diagram showing the flow of coolant in a conventional fuel cell stack, in which a separator for separating unit cells 11 of a fuel cell stack 10 is stacked, a coolant inlet manifold 13 is provided at one side of the fuel cell stack 10, and a coolant outlet manifold 15 is provided at the other side of the fuel cell stack 10 such that the coolant supplied to the coolant inlet manifold 13 passes through the unit cells 11 and the resulting coolant is collected in the coolant outlet manifold 15 at the opposite side and then discharged to the outside.

That is, the coolant introduced into the coolant inlet manifold 13 is distributed to each coolant channel 11b formed in the separator of the cell 11 to cool the corresponding cell 11 and is then collected in the coolant outlet manifold 15. The coolant collected in the coolant outlet manifold 15 is finally discharged to the outside of the fuel cell stack 10.

As such, when the coolant moves from the coolant inlet manifold 13 to the coolant outlet manifold 15 through the cells 11, it absorbs heat generated by the electrochemical reaction in the fuel cell stack 10, thereby cooling the fuel cell stack 10.

As the coolant collected in the coolant outlet manifold 15 absorbs heat during the cooling process, the temperature of the coolant is higher than that of the coolant initially supplied to the coolant inlet manifold 13.

In the conventional fuel cell stack, the temperature of the cells adjacent to the end plate 19 and the current collector 18 is relatively low during initial start-up.

Figure 2:
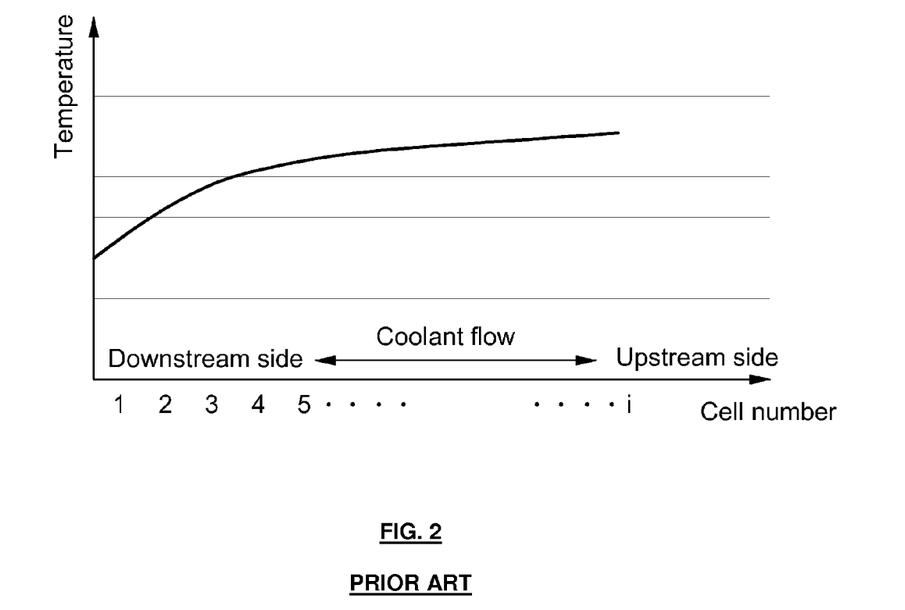
FIG. 2 is a diagram showing the temperature of coolant in a coolant outlet manifold of a conventional fuel cell stack.

FIG. 2 shows the temperature distribution of the coolant in the coolant outlet manifold of a conventional fuel cell stack, from which it can be seen that the temperature is lowered as it goes to the downstream side with respect to the coolant flow direction.

Figure 3:
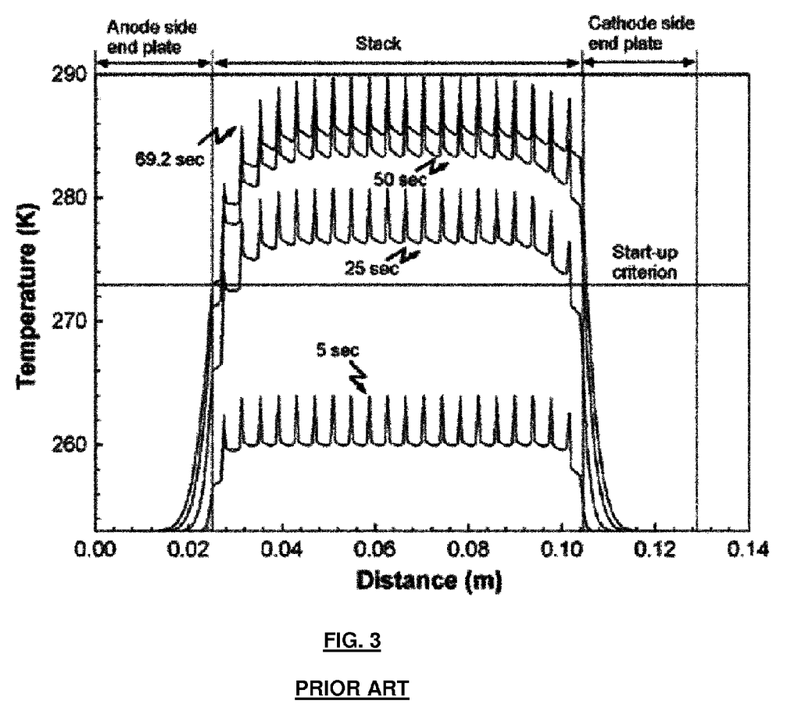
FIG. 3 is a diagram showing the analysis results of a one dimensional heat transfer model during cold start-up of a conventional fuel cell stack.

FIG. 3 shows the analysis results of a one dimensional heat transfer model during cold start-up of the conventional fuel cell stack, from which it can also be seen that the temperature of the cells more adjacent to the end plate is lower during cold start-up. Therefore, it is necessary to improve the temperature distribution in the fuel cell stack by uniformly maintaining the temperature of the whole cells.

Conventionally, a thick device for thermally insulating or heating is inserted between the end plate and the stacked cells to prevent temperature reduction.

For example, U.S. Pat. No. 6,824,901 discloses a method of inserting a thick insulator between an end plate and a separator to thermally insulate the region where a reaction occurs. The patent also discloses disposing a plane heater between the end plate and the separator to maintain the temperature of the entire fuel cell stack at a predetermined level.

In another example, Korean Patent No. 747,865 (Aug. 2, 2007) discloses a fuel cell stack in which a current collector is formed of at least one material having a different coefficient of thermal expansion to use a change in thickness according to the temperature, i.e., a difference in contact resistance according to the temperature. That is, when the temperature is low, the contact resistance is increased by the contraction of the material having a high coefficient of thermal expansion such that the current collector serves as a heater by the resistance as well as the current collection. When the temperature is low, the contact resistance is reduced such that the current collector performs only the current collection.

In yet another example, Korean Patent No. 747,869 (Aug. 2, 2007) discloses a stack fixture structure for cold start-up of a fuel cell vehicle, in which a cover for covering the outside of an end plate is attached to a fuel cell stack to enable the cold start-up of a fuel cell, thereby forming an air layer for thermal insulation.

However, these prior art solutions have significant disadvantages. In the case where the entire end plate is thermally insulated, the thickness of the insulator for the thermal insulation should be increased, which increases the thickness of the entire fuel cell stack. In the case where the cover is attached to the outside of the end plate, it is impossible to prevent the heat generated in the electrode from being transferred to the end plate.

Moreover, in the case where the heater is disposed between the end plate and the separator, it is necessary to supply power for the operation of the heater from the outside, and thus an auxiliary device for power supply should be provided. Moreover, since the operation of the heater should be controlled, the control system is complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made, in part, to solve the above-described problems associated with prior art. Accordingly, the present invention provides a fuel cell stack which can reduce variation in temperature distribution of whole fuel cells. The invention relates to a change in the structure of a coolant inlet manifold and a coolant outlet manifold in the fuel cell stack without the use of a conventional insulator, which disadvantageously increases the thickness of the fuel cell stack, a heater, which disadvantageously requires a power supply and its control logic, or a cover for forming an air layer for thermal insulation, which disadvantageously prevents the heat generated in the electrode from being transferred to the end plate.

In one aspect, the present invention provides a fuel cell stack with improved temperature uniformity, comprising one or more coolant flow guide members (e.g., a vane or similar structure) in a coolant outlet manifold and/or a coolant inlet manifold, which causes coolant (or a portion thereof) present in the coolant outlet manifold to be recirculated to the coolant inlet manifold and then back through one or more predetermined cells adjacent to the end plate.

In a preferred embodiment, the one or more coolant flow guide members of the coolant outlet manifold may be a vane placed in the coolant outlet manifold at the end(s) of a coolant channel of one or more predetermined cells to guide a portion of the coolant flowing through the coolant outlet manifold into the coolant channel of the predetermined cell(s).

In another preferred embodiment, one or more vanes may be provided in or at the ends of the coolant channels of more than one predetermined cell through which the coolant is sought to be recirculated. In this manner, the coolant is recirculated from the coolant outlet manifold through the predetermined cells in which the vane is provided, thereby flowing into the coolant inlet manifold. The coolant in the coolant inlet manifold then reenters one or more coolant channels as determined by the coolant flow guide member of the coolant inlet manifold, thereby returning the coolant back to the coolant outlet manifold. In this manner, a portion of the coolant beginning in the coolant outlet manifold may be recirculated through the coolant inlet manifold and returned to the coolant outlet manifold as determined by the placement and arrangement of the coolant flow guide members of the manifolds.

In yet another preferred embodiment, the coolant flow guide member of the coolant inlet manifold may be an airtight flow member which is provided to seal the end periphery of the coolant channels of predetermined cells through which the coolant is to be recirculated back to the coolant outlet manifold. Once the coolant redirected from the coolant outlet manifold reaches the coolant inlet manifold, the coolant is guided to one or more adjacent coolant channels by the coolant flow guide member of the coolant inlet manifold and returned to the coolant outlet manifold. In this manner, a portion of the coolant beginning in the coolant outlet manifold may be recirculated through the coolant inlet manifold and returned to the coolant outlet manifold as determined by the placement and arrangement of the coolant flow guide members of the manifolds.

In still yet another preferred embodiment, the airtight flow member may integrally seal the end periphery of the coolant channels of the whole cells, through which the coolant is recirculated. In still another embodiment, the airtight flow member may comprise a plurality of airtight flow members to divide the whole cells and seal the distal periphery of the coolant channel of each cell.

In another preferred embodiment, the present invention provides a fuel cell stack with improved temperature uniformity, comprising: a plurality of cells forming the cell stack, a coolant inlet manifold at one end of the cell stack, and a coolant outlet manifold on the other end of the cell stack, and an end plate, said cells each comprising a coolant channel between the inlet and outlet manifolds. The fuel cell stack of the invention further comprises a first coolant flow guide member positioned in the coolant outlet manifold and being in contact with a first predetermined cell that is substantially adjacent to the end plate. The fuel cell stack also comprises a second coolant flow guide member positioned in the coolant inlet manifold and being in contact with a second predetermined cell that is adjacent to the first predetermined cell. In operation, the coolant from the coolant inlet manifold is guided into the first predetermined cell by the first coolant guide member and flows through the coolant channel of the first predetermined cell to the coolant inlet manifold, wherein the coolant is then guided by the second coolant guide member to flow into the second predetermined cell and flows through the coolant channel of the second predetermined cell back to the coolant outlet manifold, thereby providing improved temperature uniformity throughout the fuel cell stack.

The first coolant flow guide member can be a vane which is provided at the end of the coolant channel of the first predetermined cell.

The second coolant flow guide member can be an airtight flow member which is provided to seal the end periphery of the coolant channels of the cells, through which the coolant is recirculated to be returned to the coolant outlet manifold.

The airtight flow member can be integrally sealed with the end periphery of the coolant channels of the whole cells, through which the coolant is recirculated, or the airtight flow member can comprise a plurality of airtight flow members to divide the whole cells and seal the distal periphery of the coolant channel of each cell.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not meant to limit the present invention, and wherein.

Reference numerals set forth in the Drawings includes reference to the following elements as further discussed below:

| | |
|---|---|
| 10: fuel cell stack | 11: cell |
| 11a: downstream cell (low temperature cell) | |
| 13: coolant inlet manifold | 14: airtight flow member |
| 15: coolant outlet manifold | 16: vane |
| 18: current collector | 19: end plate |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. To the contrary, the invention is intended to cover not only the exemplary embodiments, but also various alternatives, modifications, equivalents and other embodiments, which may be included within the spirit and scope of the invention as defined by the appended claims.

The present invention provides a fuel cell stack which can improve temperature uniformity of unit cells by simply changing the flow path of coolant in the fuel cell stack without the use of a conventional insulator, which disadvantageously increases the thickness of the fuel cell stack, a heater, which disadvantageously requires a power supply and its control logic, or a cover for forming an air layer for thermal insulation, which disadvantageously prevents the heat generated in the electrode from being transferred to the end plate.

As a result of the invention, the variation in temperature distribution of whole cells is reduced in such a manner that the coolant passing through high temperature cells transfers heat absorbed during cooling to low temperature cells adjacent to an end plate and a current collector.

The present invention provides advantageous structural modifications to coolant inlet manifold and the coolant outlet manifold of a fuel cell stack, whereby such changes cause the coolant passing through the high temperature cells (i.e., the coolant absorbing heat during cooling of the other cells) is recirculated to be supplied to one or more cells adjacent to the end plate in which the temperature is relatively low.

That is, the invention provides a structure whereby the coolant passing through the high temperature cells is allowed to pass through the low temperature cells adjacent to the end plate. The coolant moving to the coolant outlet manifold (i.e., the heated coolant passing through the other cells) is recirculated to the low temperature cells at the downstream side adjacent to the end plate such that the heat energy at the upstream side is transmitted to the low temperature cells at the downstream side, thereby providing improved temperature uniformity throughout the whole fuel cell stack.

The present invention operates to distribute the high temperature coolant derived the individual cells of the fuel cell stack and collected in the coolant outlet manifold to coolant channels of the low temperature cells at the downstream side of the coolant outlet manifold, thereby ensuring uniform distribution of the temperature of the entire fuel cell stack.

The fuel cell stack according to the present invention will be described in more detail with reference to the accompanying drawings.

Figure 4A:
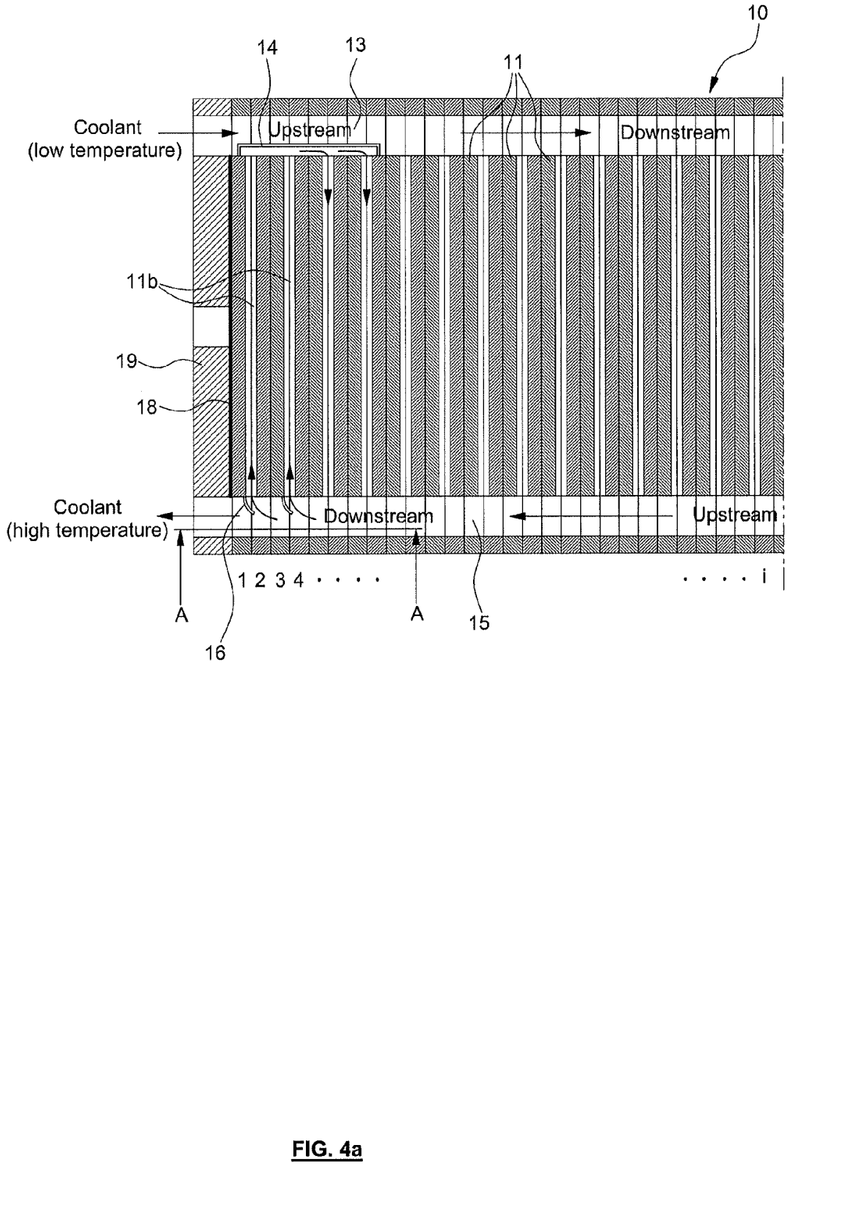
FIGS. 4A and 4B are schematic diagrams showing the configuration of a fuel cell stack in accordance with a preferred embodiment of the present invention.
Figure 4B:
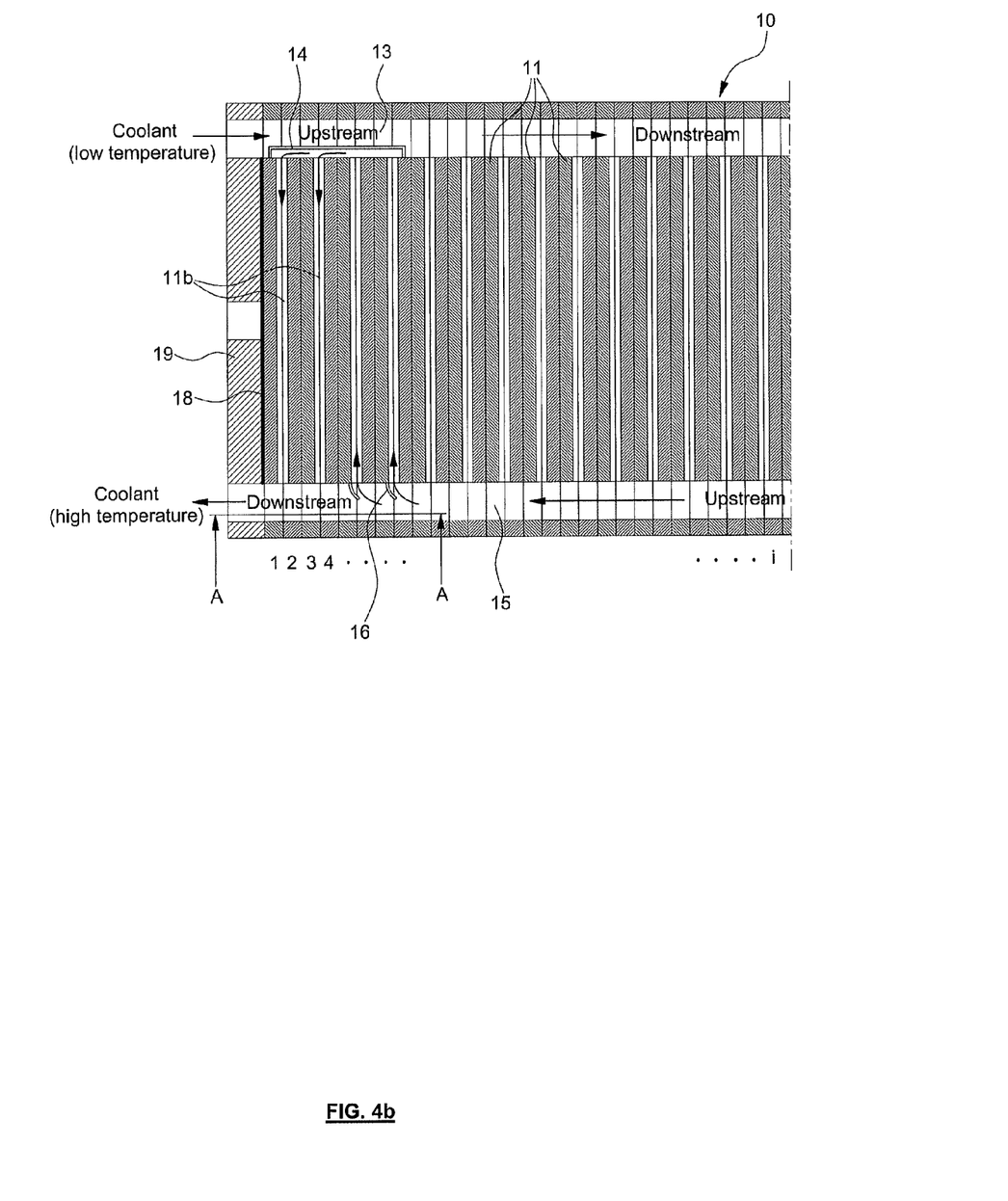
Figure 5A:
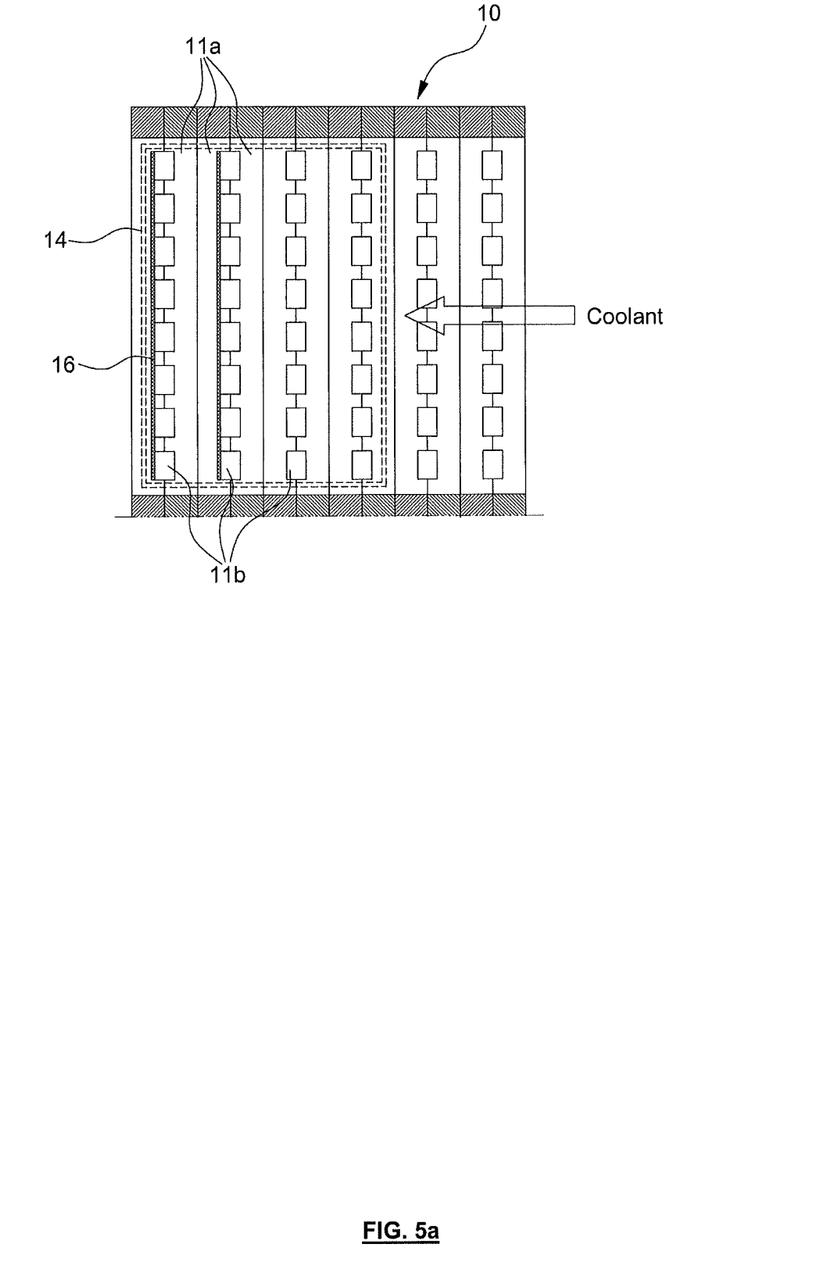
FIGS. 5A and 5B are cross-sectional views showing a coolant flow guide vane and an airtight flow member provided in the fuel cell stack shown in FIGS. 4A and 4B, which are taken along lines A-A in FIGS. 4A and 4B, respectively.
Figure 5B:
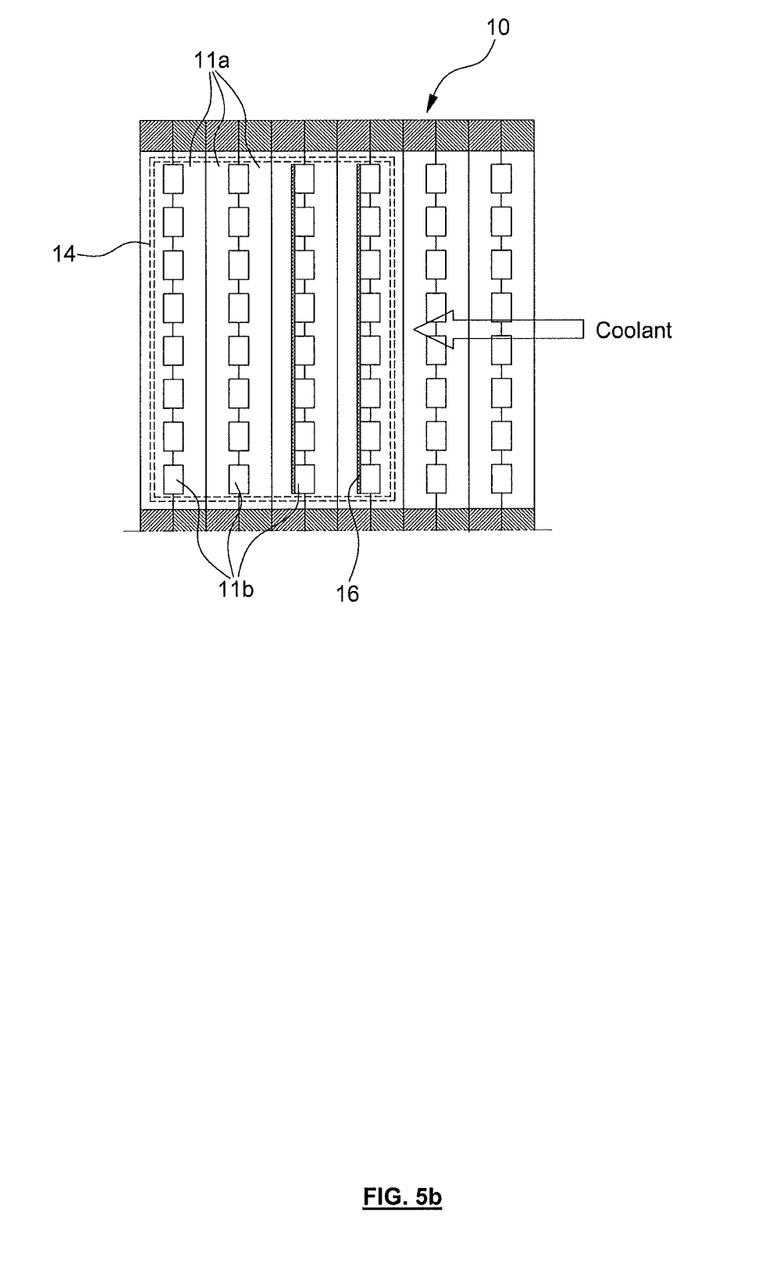

FIGS. 4A and 4B are schematic diagrams showing the configuration of a fuel cell stack in accordance with a preferred embodiment of the present invention, and FIGS. 5A and 5B are cross-sectional views showing a coolant flow guide vane and an airtight flow member provided in the fuel cell stack shown in FIGS. 4A and 4B, which are taken along lines A-A in FIGS. 4A and 4B, respectively. In FIGS. 5A and 5B, a vane 16 provided in a coolant outlet manifold is shown as a cross section and an airtight flow member 14 provided in a coolant inlet manifold at the opposite side is shown as a hidden line.

Figure 6:
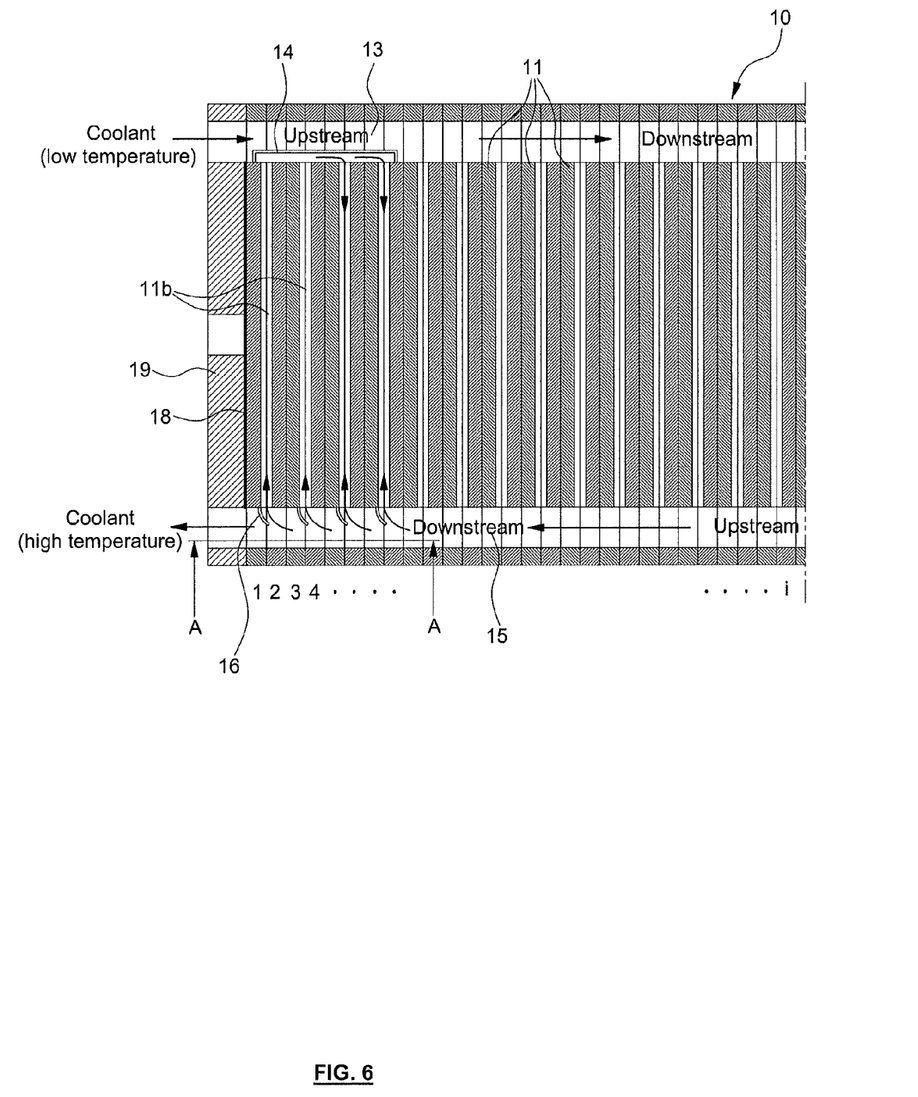
FIG. 6 is a schematic diagram showing a fuel cell stack in accordance with another embodiment of the present invention.
Figure 7:
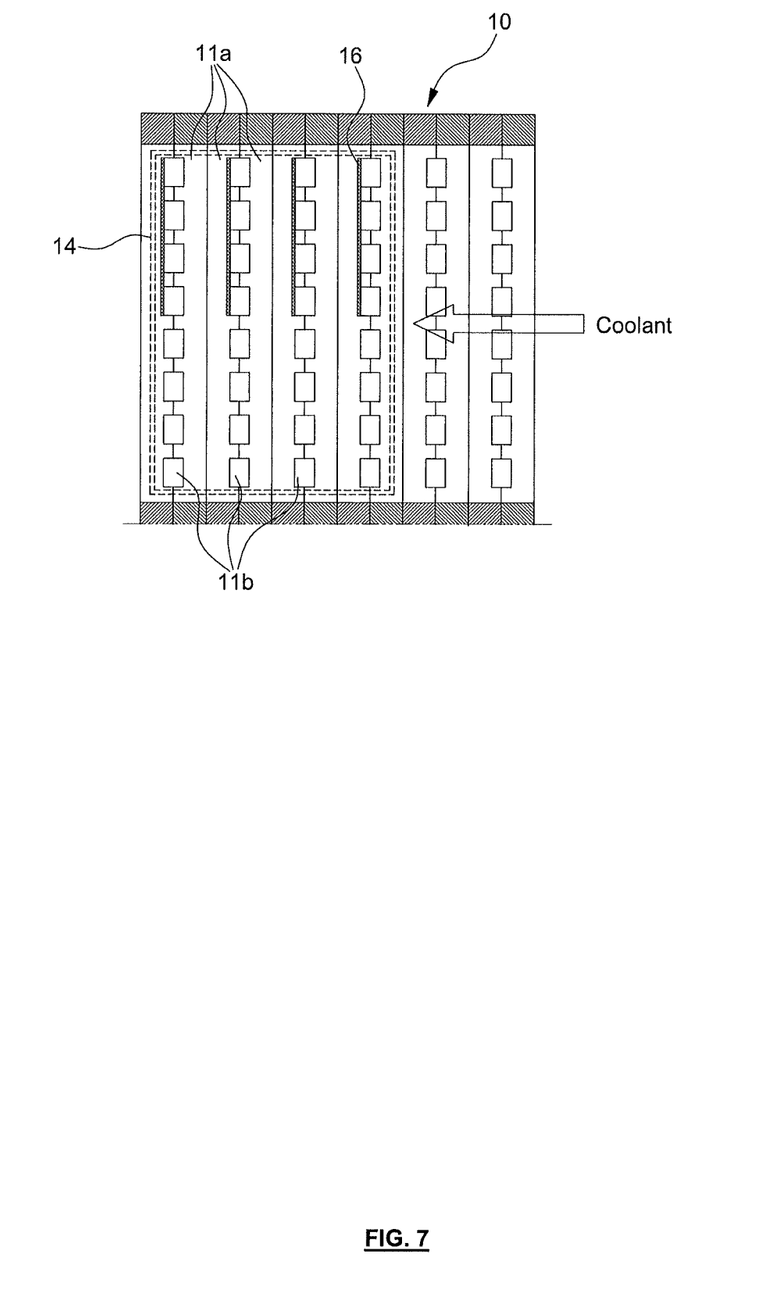
FIG. 7 is a cross-sectional view showing a coolant flow guide vane and an airtight flow member provided in the fuel cell stack shown in FIG. 6, which is taken along line A-A of FIG. 6.

Moreover, FIG. 6 is a schematic diagram showing a fuel cell stack in accordance with another embodiment of the present invention, and FIG. 7 is a cross-sectional view showing a coolant flow guide vane and an airtight flow member provided in the fuel cell stack shown in FIG. 6, which is taken along line A-A of FIG. 6. In FIG. 6, an airtight flow member 14 provided in a coolant inlet manifold is shown as a hidden line.

First, coolant introduced into a fuel cell stack 10 passes through a coolant inlet manifold 13 and is distributed to each coolant channel 11b formed on a separator of a cell 11, and coolant at a low temperature, which does not pass through each cell 11, flows through the coolant inlet manifold 13.

On the contrary, the coolant distributed from the coolant inlet manifold 13 to the coolant channels 11b and passing through the cells 11 moves to the coolant outlet manifold 15 and is collected therein. Accordingly, the temperature of the coolant moving to the coolant outlet manifold 15 is high since it absorbs the reaction heat from the cells 11.

Therefore, in the present invention, the high temperature coolant in the coolant outlet manifold 15 is guided to pass through the cells at the distal end of the fuel cell stack 10, i.e., the low temperature cells 11a (at the downstream side) adjacent to an end plate 19 such that the temperature of the low temperature cells 11a is increased, thereby uniformly maintaining the temperature distribution of the entire fuel cell stack in a predetermined range.

For this purpose, the coolant flow guide member for recirculating the high temperature coolant passing through the other cells to the low temperature cells 11a located at the downstream side of the coolant outlet manifold 15 and at the upstream side of the coolant inlet manifold 13 is further provided.

The coolant flow guide member includes a coolant flow guide vane 16 provided at the downstream side of the coolant outlet manifold 15 and an airtight flow member 14 provided at the upstream side of the coolant inlet manifold 13.

The airtight flow member 14 is formed into a cover structure for sealing the distal periphery of the coolant channels 11b of the low temperature cells 11a at the upstream side (the same cells as the low temperature cells at the downstream side of the coolant outlet manifold 15). The airtight flow member 14 serves to separate the flow space of the coolant newly introduced into the coolant inlet manifold 13 from the flow space of the recirculating coolant passing through the low temperature cells 11a at the upstream side.

As the coolant inlet manifold distributes the newly introduced coolant to the coolant channel of each cell, the airtight flow member 14 serves to separate the flow fields such that the recirculating coolant is not mixed with the low temperature coolant newly introduced into the coolant inlet manifold.

Moreover, the coolant flow guide vane 16 is provided at the ends of the coolant channels 11b of several low temperature cells 11a, into which the high temperature coolant is introduced from the coolant outlet manifold 15. One side of the coolant flow guide vane 16 is fixed to the end of the coolant channel 11b and the other side is bent or inclined to face the upstream side of the coolant outlet manifold 15.

Here, the vane 16 is provided at the ends of the coolant channels 11b of several cells among the low temperature cells 11a at the downstream side (i.e., among the cells through which the coolant is recirculated) or provided at the ends of several coolant channels of each low temperature cell at the downstream side to serve as a guide plate for guiding a portion of the high temperature coolant flowing to the downstream side in the coolant outlet manifold to be introduced into the coolant channels of the low temperature cells.

As a result, a portion of the high temperature coolant moving from the upstream side of the coolant outlet manifold 15 to the downstream side thereof is introduced into the coolant channels 11b of the low temperature cells 11a adjacent to the end plate 19, through which the coolant is recirculated by the vane 16 (i.e., the coolant flows in a direction opposite to the other cells at the upstream side, that is, in the upward direction of FIGS. 4A, 4B and 6). The coolant passing through the low temperature cell 11a flows through the inside of the airtight flow member 14 and is supplied to the other adjacent low temperature cell 11a, through which the coolant is recirculated, or to the coolant channels 11b of the adjacent low temperature cell 11a, through which the coolant is recirculated, and the resulting coolant is mixed with the coolant, which is not recirculated, at the downstream side of the coolant outlet manifold 15 and is then discharged to the outside of the fuel cell stack.

Typically, the temperature of the coolant inlet of the fuel cell stack is similar to that of the coolant introduced. Accordingly, the airtight flow member 14 is provided such that the low temperature coolant newly introduced into the fuel cell stack 10 does not flow through several low temperature cells 11a at the upstream side with respect to the coolant inlet manifold 13. Instead, a recirculating coolant flow field, which is separated from the main flow field, is formed in the coolant inlet manifold 13, and the vane 16 for guiding the coolant to be introduced into the coolant channels 11b of the low temperature cells 11a is provided at the downstream side of the coolant outlet manifold 15 at the opposite side.

FIGS. 4A and 5A show an example in which the vane 16 is provided at the ends of the coolant channels 11b of several cells at the downstream side with respect to the coolant flow direction in the coolant outlet manifold 15 among the all of the low temperature cells 11a, through which the coolant is recirculated, and FIGS. 4B and 5B show an example in which the vane 16 is provided at the ends of the coolant channels 11b of several cells 11a at the upstream side among all of the low temperature cells 11a, through which the coolant is recirculated.

Moreover, in the examples shown in FIGS. 4A, 4B, 5A and 5B, the airtight flow member 14 provided in the coolant inlet manifold 13 covers the distal periphery of the coolant channels 11b of all of the low temperature cells 11a, through which the coolant is recirculated, to be sealed.

In this case, since the vane 16 is provided only at the coolant channels 11b of several low temperature cells 11a among all of the low temperature cells 11a, through which the coolant is recirculated, the coolant is recirculated through the cells in which the vane 16 is provided, the coolant flow guide member of the coolant inlet manifold 13, the cells in which the vane 16 is not provided, and the coolant outlet manifold 15.

FIGS. 6 and 7 show an example in which the vane 16 is provided only at the ends of several coolant channels 11b of each low temperature cell 11a, through which the coolant is recirculated. The high temperature coolant in the coolant outlet manifold 15 is supplied to the coolant channels in which the vane 16 is provided and then discharged to the airtight flow member 14 at the opposite side. The coolant passing through the airtight flow member 14 is introduced into the coolant channels in which the vane 16 is not provided and then returned to the coolant outlet manifold 15.

That is, when the airtight flow member 14 is provided in the coolant inlet manifold 13, the coolant is introduced into the coolant channels 11b in which the vane 16 is provided, and the coolant is discharged from the coolant channels in which the vane 16 is not provided.

Here, the recirculating coolant supplied from the coolant outlet manifold 15 to the coolant channels 11b by the vanes 16 passes through the cells in a direction opposite to the other cells and is then discharged to the airtight flow member 14, and the coolant returned to the coolant outlet manifold through the airtight flow member 14 is discharged from the coolant channels in which the vane 16 is not provided.

In this case, since the vane 16 is provided only at the ends of several coolant channels 11b of each low temperature cell 11a, through which the coolant is recirculated, the coolant is recirculated through the coolant channels in which the vane 16 is provided, the coolant flow guide member of the coolant inlet manifold 13, the coolant channels in which the vane 16 is provided, and the coolant outlet manifold 15.

As such, a portion of the coolant flowing from the upstream side of the coolant outlet manifold to the coolant outlet of the fuel cell stack is introduced into the low temperature cells by the vanes and then introduced into the adjacent cells or the coolant channels by the airtight flow member at the coolant inlet manifold such that the high temperature coolant is recirculated. At this time, the coolant absorbing heat energy from the high temperature cells at the upstream side with respect to the coolant flow direction in the coolant outlet manifold passes through the low temperature cells at the downstream side to transmit the heat energy.

With this, it is possible to reduce the variation in temperature distribution of the whole cells and achieve thermal insulation effect which reduces the heat lost through the end plate 19 or the current collector 18 in the fuel cell stack.

Figure 8:
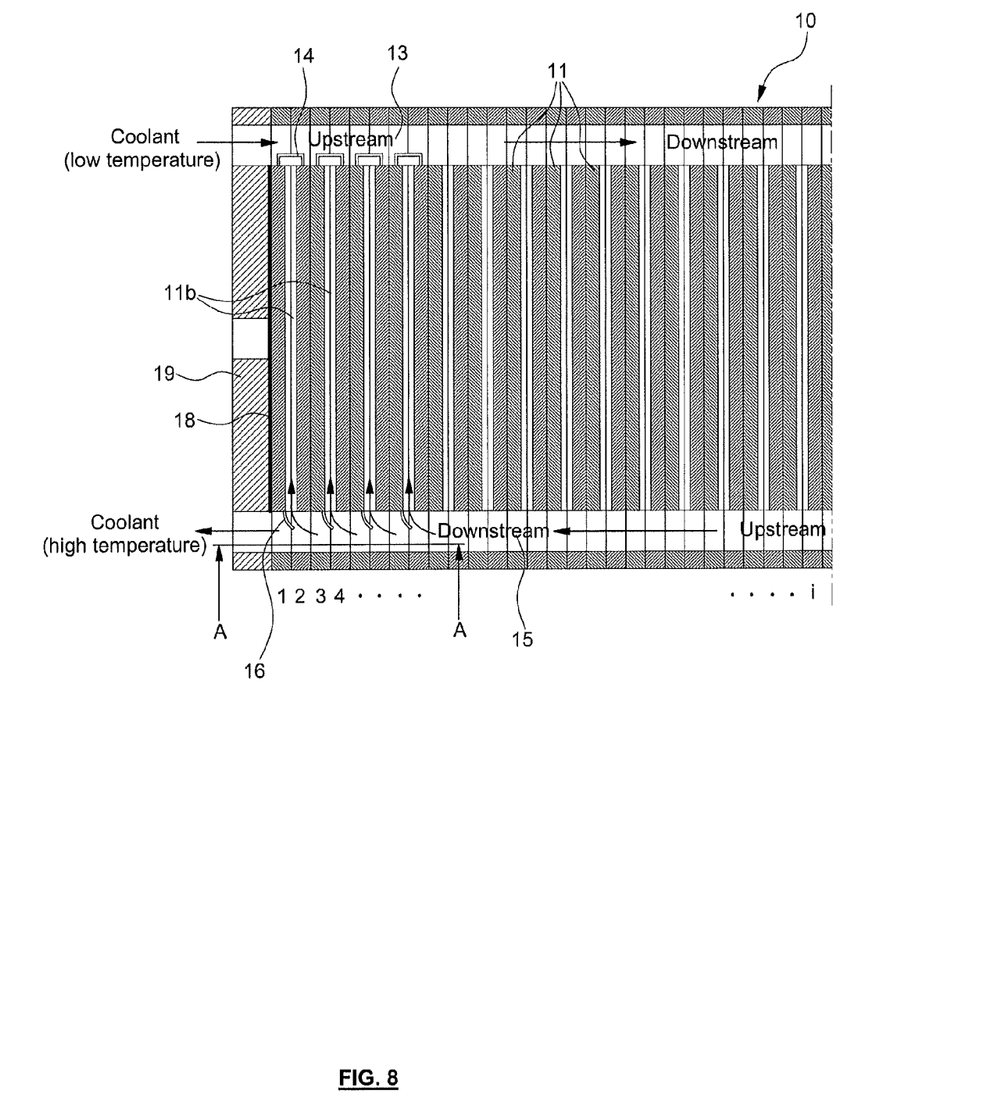
FIG. 8 is a cross-sectional view showing a fuel cell stack in accordance with still another embodiment of the present invention.
Figure 9A:
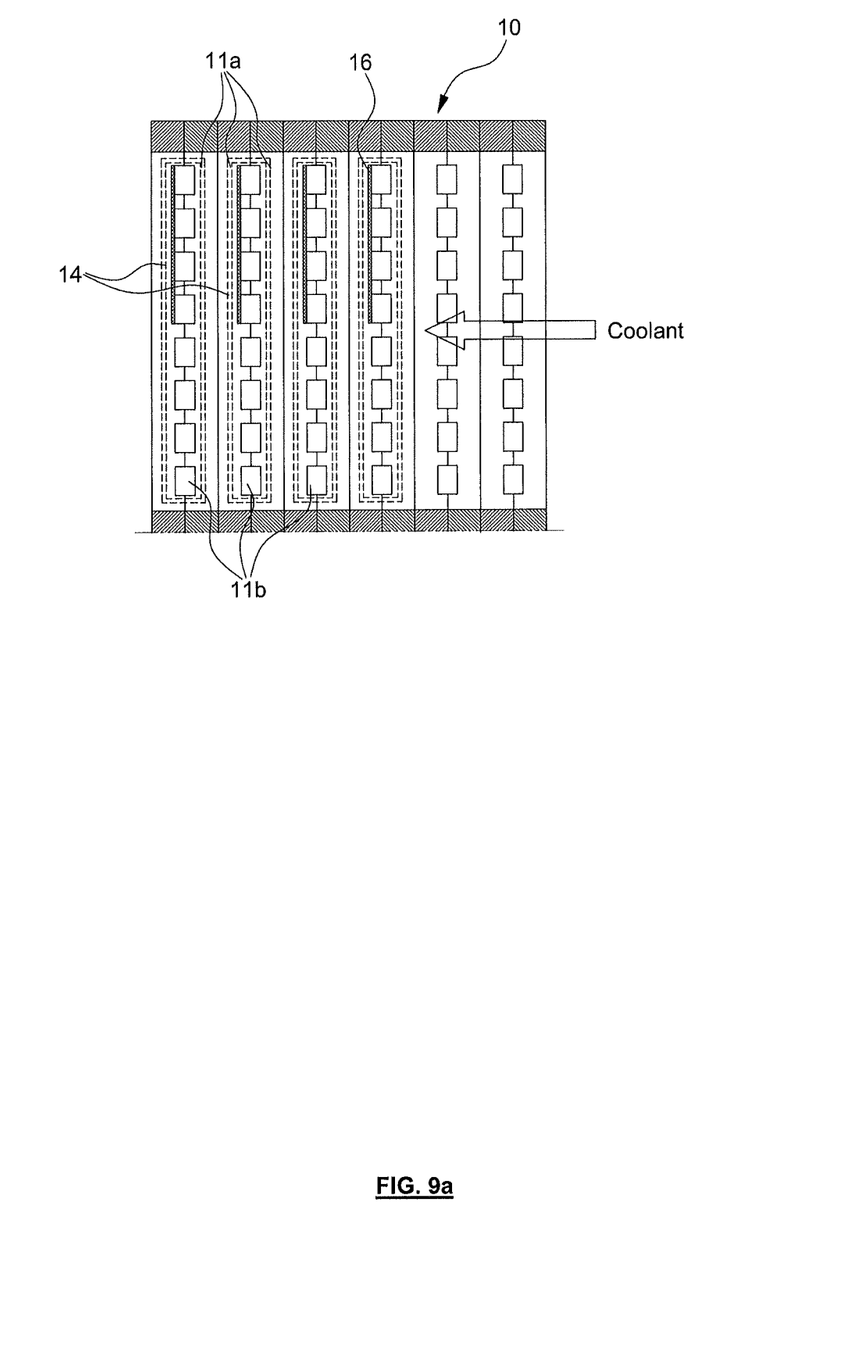
FIGS. 9A to 9C are cross-sectional views showing a coolant outlet manifold, which is taken along line A-A of FIG. 8.
Figure 9B:
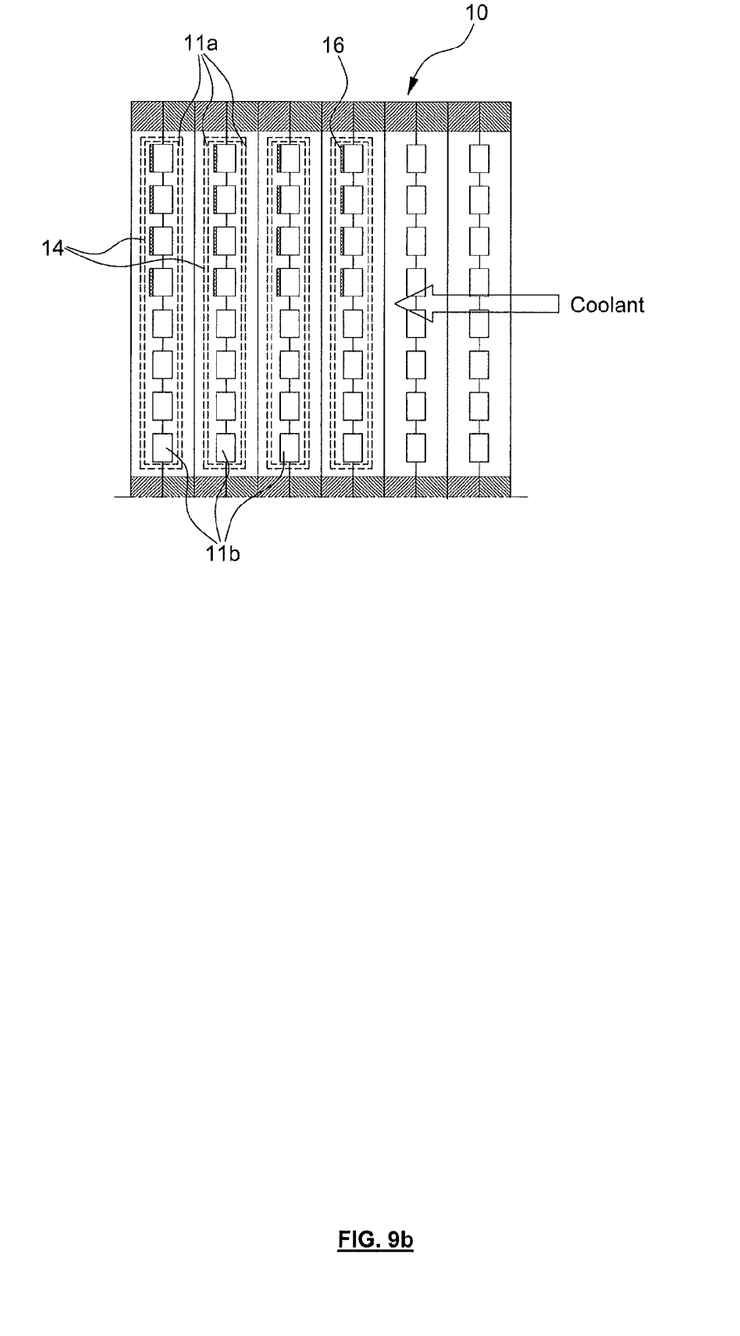
Figure 9C:
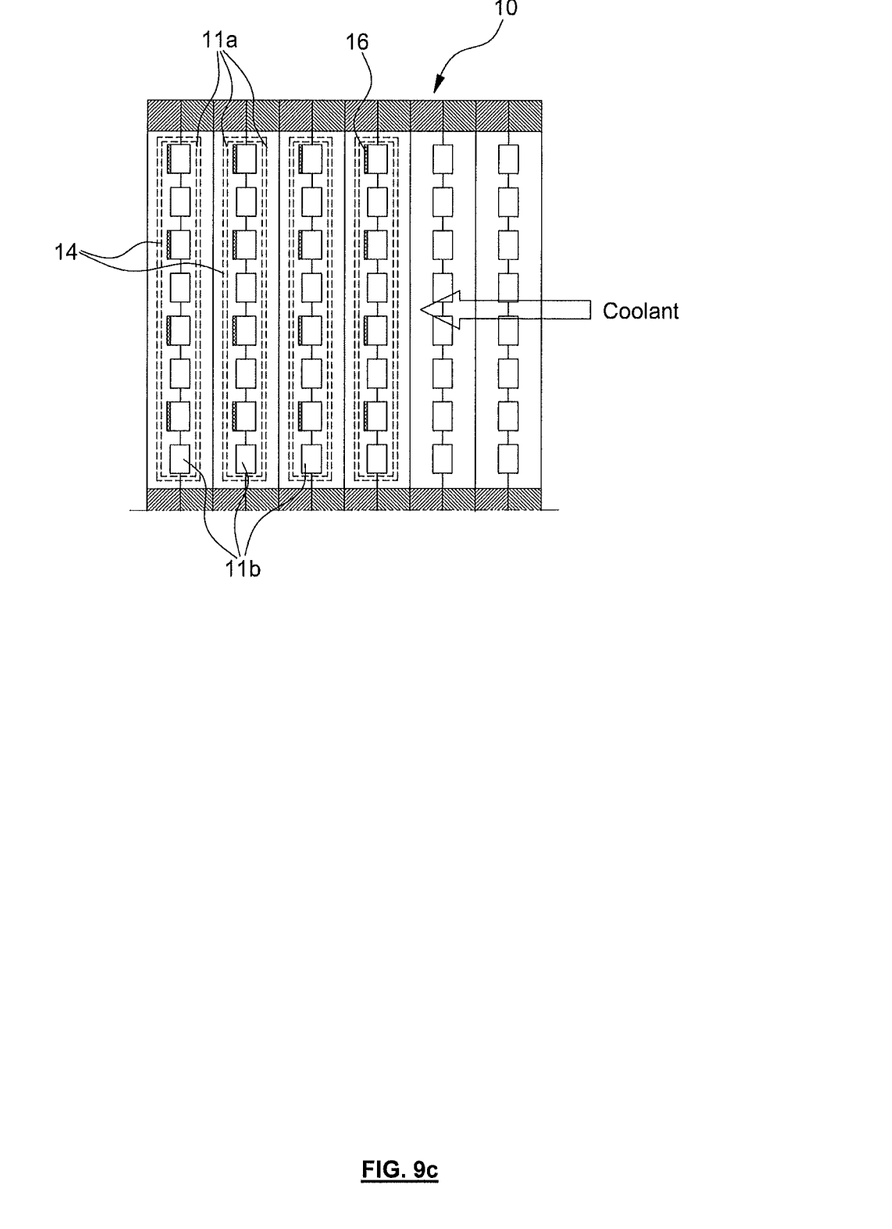

FIG. 8 is a cross-sectional view showing a fuel cell stack in accordance with still another embodiment of the present invention, and FIGS. 9A to 9C are cross-sectional views showing a coolant outlet manifold, which is taken along line A-A of FIG. 8.

While FIGS. 4A to 8 show the examples in which one airtight flow member 14 for sealing the distal periphery of the coolant channels 11b of all of the low temperature cells 11a, through which the coolant in the coolant inlet manifold 13 is recirculated, is provided, FIGS. 8 and 9A to 9C show an example in which a plurality of airtight flow members 14 for sealing the distal periphery of the coolant channel of each cell is provided.

In this example, the coolant is introduced into the coolant channels 11b in which the vane 16 is provided in the coolant outlet manifold 15 with respect to the low temperature cells 11a through which the coolant is recirculated, and the recirculating coolant which passes through the airtight flow member 14 is discharged and returned to the coolant outlet manifold 15, not passing through the coolant channels in which the vane 16 is not provided. The coolant recirculation and its effect are substantially the same as the examples of FIGS. 4A to 7.

As shown in FIGS. 9A to 9C, the vane 16 provided in the coolant outlet manifold 15 may be provided only at a portion of the coolant channels 11b on the separator of the same low temperature cell 11a. In this case, the coolant is also introduced into the coolant channels, in which the vane is provided, and discharged from the coolant channels in which the vane is not provided.

As such, in the examples of FIGS. 4A to 7, the vane 16 and the airtight flow member 14 are provided in the low temperature cells adjacent to the end plate located at the downstream side with respect to the coolant flow direction in the coolant outlet manifold 15 such that the coolant passing through the cells is recirculated to the low temperature cells adjacent to the end plate located at the downstream side, thereby improving the temperature uniformity of the whole cells.

While the vane 16 and the airtight flow member 14 for recirculating the coolant are provided in the low temperature cells adjacent to the end plate located at the downstream side with respect to the coolant flow direction in the coolant outlet manifold 15 in the above manner, they may be provided in the low temperature cells adjacent to the end plate at the upstream side.

In this case, there is no difference except that the vanes 16 and the airtight flow member 14 are provided in the cells adjacent to the end plate at the upstream side, not the downstream side.

Moreover, even in this configuration, the coolant passing through the other cells is introduced into the coolant channels of the low temperature cells by the vanes 16 and guided to the adjacent cells or coolant channels through the airtight flow member 14. Then, the coolant passes through the adjacent cells or coolant channels, moves to the coolant outlet manifold 15, and is finally discharged to the outside of the fuel cell stack.

Of course, since the coolant passing through the other cells is recirculated to the low temperature cells adjacent to the end plate in this configuration, it is possible to achieve the same effect of improving the temperature uniformity of the whole cells.

As described above, according to the fuel cell stack of the present invention, the coolant heated while passing through the cells is recirculated to the low temperature cells located adjacent to the end plate, and thus it is possible to reduce the variation in temperature distribution of the whole fuel cell stack.

Therefore, the conventional insulator which increases the thickness of the fuel cell stack, the heater which requires a power supply and its control logic, etc., are not required.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack comprising:

a first coolant flow guide member provided in a coolant outlet manifold at a first group of one or more cells adjacent to an end plate wherein the first coolant flow guide member is formed in the shape of a vane directing a portion of heated coolant within the coolant outlet manifold back into the first group of one or more cells that are adjacent to the end plate and wherein one side of the first coolant flow guide member is fixed to one end of a coolant channel in the first group of one or more cells and another side of the vane is bent or inclined to face an upstream side of the coolant outlet manifold; and a second coolant flow guide member provided in a coolant inlet manifold of the first group of one or more cells adjacent to the end plate, wherein the first coolant flow guide member is a different shape than the second coolant flow guide member, and a portion of the heated coolant flowing toward a downstream side in the coolant outlet manifold is introduced into one or more coolant channels of the first group of one or more cells.

2. A fuel cell stack comprising:

a first coolant flow guide member provided in a coolant outlet manifold at a first group of one or more cells adjacent to an end plate, the first group of cells having one or more coolant channels, wherein the first coolant flow guide member is formed in the shape of a vane directing a portion of heated coolant within the coolant outlet manifold back into the first group of one or more cells that are adjacent to the end plate, and wherein one side of the first coolant flow guide member is fixed to one end of one of the one or more coolant channels and another side is bent or inclined to face an upstream side of the coolant outlet manifold; and a second coolant flow guide member provided in a coolant inlet manifold of the first group of one or more cells adjacent to the end plate, wherein the second coolant flow guide member recirculates the heated coolant that has been previously passed through a second group of one or more cells that are not adjacent to the end plate so that the heated coolant is recirculated through the first group of one or more cells, wherein the second coolant flow guide member is an airtight flow member which is formed in a cover structure provided in the coolant inlet manifold to seal an end periphery of the one or more coolant channels of the first group of one or more cells in the coolant inlet manifold, wherein the first coolant flow guide member is a different shape than the second coolant flow guide member, and a portion of the heated coolant flowing toward a downstream side in the coolant outlet manifold is introduced into the one or more coolant channels of the first group of one or more cells.

3. The fuel cell stack of claim 2, wherein the vane is provided in the one or more coolant channels of each cell, through which the coolant is recirculated, wherein the coolant is recirculated through the one or more coolant channels in which the vane is provided, the second coolant flow guide member of the coolant inlet manifold, the coolant channels in which the vane is not provided, and the coolant outlet manifold.

* * * * *